United States Patent [19]

Carter, Jr.

[11] 4,179,479

[45] Dec. 18, 1979

[54] THERMOPLASTIC POLYURETHANE BLENDS CONTAINING A PROCESSING AID

[75] Inventor: Russell P. Carter, Jr., New Martinsville, W. Va.

[73] Assignee: Mobay Chemical Corporation, Pittsburgh, Pa.

[21] Appl. No.: 897,982

[22] Filed: Apr. 20, 1978

[51] Int. Cl.² ............................................. C08L 75/00
[52] U.S. Cl. .................................. 525/66; 525/125; 525/123
[58] Field of Search ................................. 260/859 R

[56] References Cited

U.S. PATENT DOCUMENTS

| | | | |
|---|---|---|---|
| 3,700,752 | 10/1972 | Hutchinson | 260/859 R |
| 3,829,531 | 8/1974 | Graff | 260/859 R |
| 3,859,381 | 1/1975 | Hutchinson | 260/859 R |
| 3,868,431 | 2/1975 | Hutchinson | 260/859 R |
| 3,962,370 | 6/1976 | Hutchinson | 260/859 R |
| 3,994,764 | 11/1976 | Wolinski | 260/859 R |
| 4,080,238 | 3/1978 | Wolinski | 260/859 R |

FOREIGN PATENT DOCUMENTS

| | | | |
|---|---|---|---|
| 2113865 | 1/1972 | Fed. Rep. of Germany | 260/859 R |
| 2456927 | 5/1975 | Fed. Rep. of Germany | 260/859 R |
| 1409282 | 10/1975 | United Kingdom | 260/859 R |

*Primary Examiner*—Paul Lieberman
*Attorney, Agent, or Firm*—Gene Harsh; Joseph C. Gil

[57] ABSTRACT

The instant invention is directed to novel thermoplastic polyurethane materials containing a processing aid. More particularly, the instant invention is directed to a thermoplastic polyurethane composition comprising: (A) from 40 to 100 percent by weight of a thermoplastic polyurethane, (B) from 0 to 60 percent by weight of a thermoplastic polymer selected from the group consisting of thermoplastic polycarbonates, thermoplastic polyoxymethylenes, thermoplastic acrylonitrile/butadiene/styrene graft copolymers, thermoplastic polybutylene terephthalates, thermoplastic polyethylene terephthalates, and mixtures thereof and (C) from 0.5 to 10 percent by weight based on the amount of (A) and (B), of a processing aid which is an acrylic polymer having a number average molecular weight of from 500,000 to 1,500,000. The acrylic polymers are preferably selected from the group consisting of homopolymers of methyl methacrylate and n-butyl methacrylate, copolymers of methyl methacrylate and ethyl acrylate and terpolymers of methyl methacrylate, n-butyl acrylate and styrene, said homopolymers, copolymers and terpolymers having number average molecular weights of from 500,000 to 1,500,000.

4 Claims, No Drawings

THERMOPLASTIC POLYURETHANE BLENDS CONTAINING A PROCESSING AID

BACKGROUND OF THE INVENTION

In the preparation of elastomeric polyurethanes, a high molecular weight organic compound containing active hydrogen atoms, such as a polyester, a polyether or the like, is reacted with an organic polyisocyanate and if desired, a chain-extending agent such as, for example, an amine, a glycol, water or the like, to produce an elastomeric product. The reaction mixtures can be fabricated into the final desired shape by various techniques. In one case, the reaction compositions can be mixed together simultaneously or in steps and then immediately cast into a mold having the desired configuration. Alternatively, the reaction compositions can be mixed either simultaneously or in steps, permitted to react for a short time and then by interrupting the reaction, a pseudo thermoplastic results which can be fabricated by all the techniques suitable in the thermoplastic art. Still in another method, an interpolymer, generally referred to as a millable gum, can be prepared and this gum worked on a mill such as that used in the rubber industry, whereupon, additional ingredients and reactants, such as pigments, fillers and further quantities of curing agents such as polyisocyanates, sulfur, peroxides or the like can be added in order to effect a cure.

In all of these processes, where the reaction mixture is subjected to a subsequent shaping technique, and particularly where thermoplastic techniques are used, polyurethanes in general, do not always exhibit good processing characteristics. For example, if an extrusion or injection molding is to be made, it is sometimes difficult to fabricate the desired article. Necessarily, the art has looked to various techniques of improving the processing of polyurethane elastomers. Characteristic of these techniques are the addition of processing aids such as poly-lower alkyl styrene resins (U.S. Pat. No. 3,385,909), urea-type compounds (U.S. Pat. No. 3,321,433), and polyolefins (U.S. Pat. Nos. 3,351,676 and 3,310,604).

Additionally, blends of thermoplastic polyurethanes with other thermoplastic materials are known. The other thermoplastic material is usually chosen so as to enhance one or more of the properties of the polyurethane elastomer. Thus, e.g., graft copolymers of polybutadiene, styrene and acrylonitrile have been added to thermoplastic polyurethanes in order to increase the tear strength thereof (see, e.g., U.S. Pat. No. 3,049,505). Additionally, various thermoplastic polyoxymethylenes have been added to thermoplastic polyurethane in order to reduce the permanent elongation thereof, to increase the notch toughness thereof, and to improve the resistance thereof to degradation under different environmental conditions (see, e.g. Canadian Patent No. 842,325 and British Patent No. 1,017,244). Finally, thermoplastic polycarbonates have been blended with thermoplastic polyurethanes to increase the hardness, and set and tear strength of the thermoplastic polyurethane and to provide materials having improved resistance to environmental stress crazing and cracking (see, e.g. U.S. Pat. No. 3,431,224 and U.S. application Ser. No. 705,745, filed July 15, 1976).

Although the blends described above represent an important advance in the art, all suffer from various problems during the processing thereof. All of the blends noted have one characteristic in common. Specifically, all phases in the blend are thermoplastic and melt at some point during the molding and/or extrusion thereof. Necessarily this means that the ultimate properties of the final product will depend upon the degree of mixing of the components. As with the pure thermoplastic polyurethane, such blends also suffer from various processing problems such as non-uniformly melt flow and the like.

DESCRIPTION OF THE INVENTION

It has been found that many of the processing problems associated with thermoplastic polyurethanes (or polyurethane elastomers) and thermoplastic polyurethane blends can be overcome by including in the composition relatively small amounts of methyl methacrylate polymer and/or copolymers thereof.

The instant invention is therefore directed to a thermoplastic polyurethane composition comprising:

(A) from 40 to 100 percent by weight of a thermoplastic polyurethane, (B) from 0 to 60 percent by weight of a thermoplastic polymer selected from the group consisting of thermoplastic polycarbonates, thermoplastic polyoxymethylenes, thermoplastic acrylonitrile/butadiene/styrene graft copolymers, thermoplastic polybutylene terephthalates, thermoplastic polyethylene terephthalates, and mixtures thereof, and (C) from 0.5 to 10 percent by weight, based on the combined amount of (A) and (B) of a processing aid which is an acrylic polymer having a number average molecular weight of from 500,000 to 1,500,000. The acrylic polymer is preferably selected from the group consisting of homopolymers of methyl methacrylate, copolymers of methyl methacrylate and n-butyl methyacrylate, copolymers of methyl methacrylate and ethyl acrylate, and terpolymers of methyl methacrylate, n-butyl acrylate and styrene, said homopolymers, copolymers and terpolymers having a number average molecular weight of between 500,000 and 1,500,000.

When added to the thermoplastic polyurethanes and the thermoplastic polyurethane blends described herein, the processing aid (C) allows for better mixing of the components, as well as a more homogeneous melt. These additives promote better dispersion, surface gloss and processing: Injection molding pressures and cycle time are generally reduced by the addition of these acrylate materials. Finally, the hot metal release and lubricity of the thermoplastic are enhanced.

THE POLYURETHANE COMPONENT

The thermoplastic polyurethanes usable in the instant invention are those used and generally known in the art.

Suitable thermoplastic polyurethanes useful in the invention are those prepared from a diisocyanate, a polyester or polyether and a chain extender. These thermoplastic polyurethanes are those which are substantially linear and maintain thermoplastic processing characteristics.

The thermoplastic polyurethanes may be synthesized by methods disclosed e.g. in U.S. Pat. No. 3,214,411 incorporated herein by reference. A particularly useful polyester resin used as a starting material for the thermoplastic polyurethane are those produced from adipic acid and a glycol having at least one primary hydroxyl group. The adipic acid is condensed with a suitable glycol or mixture of glycols which have at least one primary hydroxyl group. The condensation is stopped when an acid number of from about 0.5 to about 2.0 is reached. The water formed during the reaction is removed simultaneously therewith or subsequently thereto such that the final water content is from about 0.01 to about 0.02% preferably from about 0.01 to 0.05%.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol and the like. In addition to the glycols, a small amount of trihydric alcohol up to about 1% may be used along with the glycols such as, for example, trimethylolpropane, glycerine, hexanetriol and the like. The resulting hydroxyl polyester has a molecular weight of at least about 600, a hydroxyl number of about 25 to about 190 and preferably between about 40 and about 60, and an acid number of between about 0.5 and about 2 and a water content of 0.01 to about 0.2%.

The organic diisocyanate to be used in the preparation of the elastomer is preferably 4,4'-diphenylmethane diisocyanate. It is desired that the 4,4'-diphenylmethane diisocyanate contain less than 5% of 2,4'-diphenylmethane diisocyanate and less than 2% of the 2,2'-dimer of diphenylmethane diisocyanate. It is further desired that the acidity calculated as HCl is from about 0.0001 to about 0.02%. The acidity calculated as percent HCl is determined by extracting the chloride from the isocyanate in a hot aqueous methanol solution or by liberating the chloride on hydrolysis with water and titrating the extract with a standard silver nitrate solution to obtain the chloride ion concentration present.

Other diisocyanates may be used in preparing the thermoplastic processable polyurethanes such as ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate and the like.

Any suitable chain extending agent having active hydrogen containing groups reactive with isocyanate groups may be used such as, for example, diols including ethylene glycol, propylene glycol, butylene glycol, 1,4-butanediol, butenediol, butynediol, xylylene glycols, amylene glycols, 1,4-phenylene-bis-β-hydroxy ethyl ether, 1,3-phenylene-bis-β-hydroxy ethyl ether, bis-(hydroxy-methyl-cyclohexane), hexanediol, thiodiglycol and the like; diamines including ethylene diamine, propylene diamine, butylene diamine, hexamethylene diamine, cyclohexalene diamine, phenylene diamine, tolylene diamine, xylylene diamine, 3,3'-dichlorobenzidine, 3,3'-dinitrobenzidine and the like; alkanol amines such as, for example, ethanol amine, aminopropyl alcohol, 2,2-dimethyl propanol amine, 3-aminocyclohexyl alcohol, p-aminobenzyl alcohol and the like. The difunctional chain extenders mentioned in U.S. Pat. Nos. 2,620,516, 2,621,166 and 2,729,618 incorporated herein by reference may be used. If desirable, a small amount of polyfunctional material may be utilized. This polyfunctional chain extender, however, should not be present in an amount greater than about 1% by weight. Any suitable polyfunctional compound may be used in this application such as, for example, glycerine, trimethylolpropane, hexanetriol, pentaerythritol and the like.

In accordance with the process of this invention, the polyester, the organic diisocyanate and the chain extender may be individually heated preferably to a temperature of from about 60° C. to about 135° C. and then the polyester and chain extender are substantially simultaneously mixed with the diisocyanate. In a preferred embodiment, the chain extender and the polyester each of which has been previously heated, are first mixed and the resulting mixture is mixed with heated diisocyanate. This method is preferred for the reason that the extender and the polyester will not react prior to the introduction of the diisocyanate and rapid mixing with the diisocyanate is thus facilitated. The mixing of the polyester, the chain extender and diisocyanate may be suitably carried out by using any mechanical mixer such as one equipped with a stirrer which results in intimate mixing of the three ingredients in a short period of time. If the material begins to become too thick, either the temperature may be lowered or a small amount of citric acid or the like of from about 0.001 to about 0.050 parts by weight based on 100 parts of the polyester may be added to slow down the reaction. Of course, to increase the rate of reaction, any suitable catalyst may be added to the reaction mixture such as tertiary amines and the like as set forth in U.S. Pat. Nos. 2,620,516, 2,621,166 and 2,729,618. The reaction mixture, after complete mixing, is conducted onto a suitable heated surface or poured onto a table or conveyor and preferably maintained at a temperature of from about 60° C. to about 135° C. until it solidifies, e.g., into a slab so that it is still a thermoplastic and can be easily removed and reduced to the desired particle size. To facilitate the ready removal of the material from the hot plate, the table, conveyor or other surface, the slab or other physical form may be cut or scored while it is still soft to permit removal in a number of pieces rather than as a unit. This cutting or scoring is best done while the reaction mixture is still soft, for when the material hardens it becomes difficult to cut although it can still be readily reduced in size by grinders, choppers and other equipment known in the industry.

After the reaction mixture has reacted to form a hard product which is suitable for cutting, chopping or grinding, it is cooled to room temperature. This material may then be either stored for several weeks, if desired, or it may be immediately further processed after blending with the polyacrylate processing aid and if desired, the other thermoplastic material, by extrusion, compression molding, injection molding or other similar techniques known in the industry.

Although adipate polyesters are preferred, polyesters may be used which are based on succinic acid, suberic acid, sebacic acid, oxalic acid, methyl adipic acid, glutaric acid, pimelic acid, azelaic acid, phthalic acid, terephthalic acid, isophthalic acid and the like.

A polyether may be used instead of the polyester in the preparation of the thermoplastic polyurethane and preferably polytetramethylene glycol having an average molecular weight between about 600 and 2000 and preferably about 1000. Other polyethers such as polypropylene glycol, polyethylene glycol and the like may be used providing their molecular weight is above about 600.

The above and other thermoplastic polyurethanes such as disclosed in U.S. Pat. Nos. 2,621,166, 2,729,618, 3,214,411, 2,778,810, 3,012,992, Canadian Pat. Nos. 754,233, 733,577 and 842,325 all incorporated herein by reference may be used to produce the thermoplastic polyurethanes composition herein.

Among the thermoplastic polyurethane elastomers commercially available for use in the thermoplastic material of this invention are the Texin elastoplastics of Mobay Chemical Corporation. These thermoplastic polyurethanes characteristically contain the urethane structure represented by the following formula:

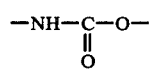

Most preferably, the polyurethanes useful in the present invention have Shore hardnesses (ASTM D2240) between about 70 on the "A" scale and 60 on the "D" scale.

Physical properties of various grades of polyurethanes are found in Saunders and Frisch, *Polyurethanes, Chemistry and Technology*, Interscience Publishers, Part II Technology, p. 383, Table XLVI; and in *An Engineering Handbook of TEXIN Urethane Elastoplastic Materials*, Mobay Chemical Corporation, Pittsburgh, Pennsylvania.

THERMOPLASTIC POLYCARBONATES

The polycarbonates useful herein are known and can be most basically defined as possessing the repetitive carbonate group

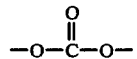

and in addition will always have the

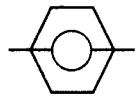

radical attached to the carbonate group (cf. U.S. Pat. No. 3,070,563).

Preferably, the polycarbonate can be characterized as possessing recurring structural units of the formula

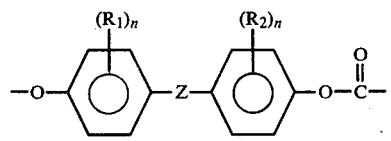

wherein Z is a single bond, an alkylene or alkylidene radical with 1–7 carbon atoms, a cycloalkylene or cycloalkylidene radical with 5 to 12 carbon atoms, —O—, —S—, —CO—, —SO— or —SO$_2$—, preferably methylene or isopropylidene; R$_1$ and R$_2$ are hydrogen, halogen or an alkylene or alkylidene radical having 1–7 carbon atoms; and n equals 0 to 4.

Most preferably, the aromatic polycarbonates useful in the practice of the invention have a melt flow rate range of about 1 to 24 gms/10 min. at 300° C. as measured by ASTM D-1238.

The most important aromatic polycarbonate on the basis of commercial availability and available technical information is the polycarbonate of bis(4-hydroxyphenyl)-2,2-propane, known as bisphenol-A polycarbonate; commercially available, for example, in four grades from Mobay Chemical Corporation a Merlon M-39 (melt flow of about 12-24), M-40 (melt flow of about 6-12), M-50 (melt flow of about 3-6) and M-60 (melt flow <3).

THE ACRYLONITRILE/BUTADIENE/STYRENE COPOLYMERS

Graft copolymers suitable for use in the production of the blends of this invention are known and may be prepared by the interaction, under polymerizing conditions, of a mixture of a vinyl cyanide and a vinyl aromatic hydrocarbon, exemplified, respectively, by acrylonitrile and styrene, with a conjugated diolefine polymer latex, exemplified by polybutadiene latex. The organic portion of the reaction mixture comprises about 40–80% by weight combined acrylonitrile plus styrene and about 60 to 20 parts by weight (dry basis) polybutadiene. The acrylonitrile preferably comprises from 10–30% by weight of the three-component organic mixture (acrylonitrile plus styrene plus polybutadiene) the styrene 30–70% by weight and the polybutadiene, correspondingly 20–60% by weight of the three-component mixture.

While this invention has been described in connection with graft copolymer blending components formed by the interaction under polymerizing conditions, for a mixture of styrene and acrylonitrile and polybutadiene latex, the invention is not limited to this particular combination of reactants.

The polybutadiene latex may be replaced in part or entirely, by other conjugated diolefine polymer latices. In the preparation of such other latices the butadiene component may be replaced, in part or entirely, by such conjugated diolefines as isoprene, pentadiene-1,3, the methyl 1,3-pentadienes, dimethyl butadiene-1,3, the 1,3- and 2,4-hexadienes and the like, including mixtures of two or more such conjugated diolefines (including butadiene-1,3).

Likewise, in the preparation of the graft copolymer blending components of this invention, the styrene may be replaced, in part or entirely, by such vinyl aromatic hydrocarbons as alpha methyl styrene, vinyl toluenes, alpha methyl vinyl toluenes and the like, including mixtures of two or more such vinyl aromatic hydrocarbons (including styrene).

Also, if desired, in the preparation of graft copolymer blending components of this invention the acrylonitrile may be replaced, in part or entirely, with other vinyl cyanides such as methacrylonitrile, ethacrylonitrile and the like, including mixtures of two or more such vinyl cyanides (including acrylonitrile).

THE THERMOPLASTIC POLYOXYMETHYLENES

The polyoxymethylenes usable according to the instant invention are known and are generally prepared by two techniques. The first is the polymerization of anhydrous monomeric formaldehyde which can be accomplished under various reaction conditions and in the presence of various catalysts which are known in the art. Suitable catalysts for the polymerization of formaldehyde include primary, secondary and tertiary aliphatic amines, cycloaliphatic amines, primary aromatic amines, arsines, stilbenes, phosphines, morpholines, hydrazines, substituted hydrazines, substituted morpholines, piperidines, metal hydrocarbons, carbodiimides, redox catalysts and the like. Polyoxymethylenes can also be prepared by the polymerization of trioxane generally in the presence of a suitable catalyst. Such catalysts for the polymerization of trioxane include antimony trifluoride, antimony fluorborate, bismuth trifluoride, bismuth oxyfluoride, Alkane sulfonic acids, thionyl chloride, phosphorous trichloride, stannic chloride, titanium tetrachloride, zirconium chloride and the like. The preparation of suitable polyoxymethylenes can occur either in the solvent phase or the vapor phase. For example, the particular material to be polymerized may be dissolved in a suitable solvent or the material, e.g., trioxane, may be reacted in the vapor phase. In addition to pure polyoxymethylenes, trioxane and/or formaldehyde can be polymerized to form copolymerized polyoxymethylenes by conducting the reaction in the presence of a co-monomer such as, for example, 2-chloro-methyl oxyethylene, cyclic ethers, alkylene carbonates such as, for example, ethylene carbonate, propylene carbonate and the like. Due to the rapid degradation of polyoxymethylenes, it is generally desirable to stabilize the end group by reaction of the polyoxymethylenes with a suitable endblocking agent such as, for example, hydrazine, substituted hydrazines, urea, thiourea, substituted ureas and thioureas, aromatic amines, phenols, N,N,N',N'-tetra(hydroxy alkyl) alkylene diamine, carboxylic acids, carboxylic acid anhydrides, carboxylic acid esters, organic monoisocyanates and the like.

POLYBUTYLENE AND POLYETHYLENE TEREPHTHALATES

The polybutylene and polyethylene terephthalates useful in the instant invention are generally known in the art. The polybutylene terephthalates employed are composed of recurring structural units of the formula

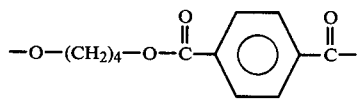

and can be produced by the process taught in U.S. Pat. No. 2,465,319 to Winfield et al. They may be prepared by heating together terephthalic acid and an excess of tetramethylene glycol at a temperature between 220° and 240° C. and thereafter heating the reaction mixture in the absence of air and presence of nitrogen or other inert gas for some hours until a desired intrinsic viscosity is reached. The resins can then be heated under vacuum to remove by-products. For the purposes of the present invention the polybutylene terephthalic polyester should generally have an intrinsic viscosity of at least about 0.60 and preferably between 1.20 and 1.30. As is well known, intrinsic viscosity is determined as an indication of the more difficulty measurable molecular weight of condensation polymers and is defined as:

Limit nsp,/C as C approaches zero where nsp is the viscosity of a dilute orthochlorophenol solution of the polyester divided by the viscosity of the orthochlorophenol solvent per se measured in the same units at the same temperature, and C is the concentration in grams of the polyester per 100 cc of solution, as is set forth in the specification, column 3 of U.S. Pat., Izard et al No. 2,597,643.

The polybutylene terephthalates employed are commercially available as Eastman 6 PRO having an intrinsic viscosity of about 1.22 and as VITUF 4884 of the Goodyear Tire and Rubber Company having an intrinsic viscosity of about 1.25 cf., their bulletin entitled "Polyester-VITUF Polyesters for Injection Molding".

Polyethylene terephthalates are, as known, produced in a similar manner. U.S. Pat. Nos. 4,034,016, 3,740,371 and 4,018,738, describe other useful polybutylene and polyethylene terephthalates.

THE PROCESSING AID

As hereinbefore noted the additive of the instant invention consists of an acrylic polymer. Preferably the acrylic polymer is (a) a homopolymer of methyl methacrylate, (b) a copolymer of methyl methacrylate and either n-butyl acrylate or ethyl acrylate or (c) a terpolymer of methyl methacrylate, n-butyl acrylate and styrene, said homopolymer, copolymers and terpolymers having a number average molecular weight of between 500,000 and 1,500,000. These acrylic polymers are known in the art and are commercially available. In fact, the preferred processing aids of the instant invention are known in the art to be useful as processing aids for polyvinyl chloride resins. As is known in the art, they may be prepared via the solvent polymerization process. A more detailed description of the methods of preparation of the acrylates of the instant invention can be found in "POLYMERS AND RESINS", Golding, 1959, pages 454–462, the disclosure of which is herein incorporated by reference. The amount of processing aid is generally from 0.5 to 10 percent by weight based on total amount of thermoplastic resin present and is preferably used in an amount of from 1 to 5 percent by weight. If the amount exceeds 10 percent, it has been found that the low temperature impact decreases.

As is apparent, the components of the instant invention are all known and available in the art. In fact, in some instances the blends of the thermoplastic polyurethanes with the second thermoplastic material are known. U.S. Pat. No. 3,049,505, the disclosure of which is herein incorporated by reference, describes blends of thermoplastic polyurethanes and graft copolymers of polybutadiene, styrene and acrylonitrile. Canadian Patent No. 842,325 and British Patent No. 1,017,244, the disclosures of which are herein incorporated by reference, describe blends of thermoplastic polyurethanes and polyoxymethylene. Finally, U.S. Pat. No. 3,431,224, the disclosure of which is herein incorporated by reference, describes blends of polycarbonate and thermoplastic polyurethanes.

In addition to the components set forth above, the compositions of the instant invention may contain many other additives generally known and used in the art such as fillers, pigments, stabilizers, plasticizers, antioxidants, and the like.

The compositions of the instant invention are made by merely blending the various components. If any of the components are solid, they are preferably ground before mixing. The blended material can be utilized directly in order to produce articles of manufacture such as motor mounts, o-rings, gears, v-belts and similar articles, or they may be extruded and pelletized to form pellets which are readily fabricated by the suitable thermoplastic technique (see, e.g. U.S. Pat. Nos. 3,642,964 and 3,963,679).

The invention is further illustrated but not limited by the following examples in which parts are by weight unless otherwise specified.

EXAMPLES

In the Examples, the following materials were used:

(A) THERMOPLASTIC POLYURETHANES:

PU-I A commercially available thermoplastic polyurethane derived from polybutylene adipate, methylene-bis(phenylisocyanate), and p-phenylene-di($\beta$-oxyethylether), having a Shore D hardness of 47 (ASTM D 2240);

PU-II A commercially available thermoplastic polyurethane derived from polybutylene adipate, methylene-bis(phenylisocyanate), and p-phenylene-di-($\beta$-oxyethylether), having a Shore D hardness of 55 (ASTM D 2240);

PU-III A commercially available thermoplastic polyurethane derived from polybutylene adipate, methylene-bis(phenylisocyanate) and 1,4-butane diol, having a Shore A hardness of 86 (ASTM D 2240);

PU-IV A commercially available thermoplastic polyurethane derived from polytetramethylene glycol, methylene-bis(phenylisocyanate) and 1,4-butane diol, having a Shore A hardness of 86 (ASTM D 2240);

PU-V A commercially available thermoplastic polyurethane derived from polytetramethylene glycol, methylene-bis-(phenylisocyanate), and 1,4-butane diol, having a Shore A hardness of 90 (ASTM D 2240).

(B) THERMOPLASTIC POLYCARBONATE

PC-I A commercially available thermoplastic polycarbonate derived from bisphenol A having a melt flow rate range of about 3–6 gms/10 min at 300° C. (ASTM D 1238).

(C) ACRYLONITRILE/BUTADIENE/STYRENE RESINS

ABS-(I) BLENDEX BTA-III N: A commercially available ABS resin, available from Borg-Warner Corporation.

| | |
|---|---|
| ABS-(II) BLENDEX 101 | Commercially available high |
| ABS-(III) BLENDEX 201 | styrene content ABS resin |
| ABS-(IV) BLENDEX 435 | from Borg-Warner Corporation |

(D) POLYOXYMETHYLENES

PM-(I) CELLCON M 25-01: A commercially available polyoxymethylene having a melt index of 2.5 and a specific gravity of 1.410;

PM-(II) CELLCON M-270-04: A commercially available polyoxymethylene having a melt index of 27.0 and a specific gravity of 1.410.

(E) POLYETHYLENE AND/OR POLYBUTYLENE TEREPHTHALATES

PT-(I) VITUF 1150: A commercially available polybutylene terephthalate having an intrinsic viscosity of 0.74;

PT-(II) VITUF 4884: A commercially available polybutylene terephthalate having an intrinsic viscosity of 1.15;

PT-(III) VITUF VFR 180: A commercially available polyethylene terephthalate having an intrinsic viscosity of 0.62.

(F) PROCESSING AIDS

PA-(I) ACRYLOID K-120N: An acrylic polymer available from Rohm and Haas Company having the following typical physical properties:

| | |
|---|---|
| Appearance | fine, white, free flowing powder |
| Bulk density, gm/cc | 0.30 |
| Viscosity, 10 percent in toluene | 600 cps (Brookfield) |
| Glass Temperature, °C. | 91 |
| Specific gravity, 25° C. | 1.18 |
| Refractive Index, 25° C. | 1.49 |
| Molecular weight | About 1,000,000 |

PA-(II) ACRYLOID K-120ND: An acrylic polymer available from Rohm and Haas Company having the following typical physical properties:

| | |
|---|---|
| Appearance | fine, white, free flowing powder |
| Bulk density, gm/cc | 0.30 |
| Viscosity, 10 percent in toluene | 600 cps (Brookfield) |
| Estimated intrinsic viscosity, dl/g | 1.44 |
| Glass Temperature, °C. | 91 |
| Specific gravity, 25° C. | 1.18 |
| Refractive Index, 25° C. | 1.49 |
| Molecular weight | About 1,000,000 |

PA-(III) ACRYLOID K-125: A predominantly syndiotactic copolymer of methyl methacrylate and n-butyl methacrylate having a number average syndiotactic block length ($\overline{N}_r$) of about 4.3, commercially available from Rohm and Haas Company.

PA-(IV) ACRYLOID K-147: A copolymer of methyl methacrylate, and ethyl acrylate having a $\overline{N}_r$ of about 3.3, suggesting a random free radical polymerization of mixed monomers, available from Rohm and Haas Company, having an estimated intrinsic viscosity, dl/g, of 0.65–0.75.

PA-(V) ACRYLOID K-175: A terpolymer of methyl methacrylate, n-butyl acrylate, and styrene having a $\overline{N}_r$ of about 4.5, available from Rohm and Haas Company, having a bulk density of 0.37 gm/cc and a specific gravity of 1.05.

(G) MISCELLANEOUS ADDITIVES

AI ACRAWAX C: N,N'-distearylethylene diamine.
AII ACRAWAX HM-S: A commercially available wax believe to be the double molecule of AI.

AIII EPOLENE C-17: A polyethylene having a density of 0.915 g/cc and a melt index of from 17-23 (ASTM D 1238 E).
AIV IRGANOX 1010: tetrakis[methylene(3,5-di-tert. butyl-4-hydrocinnamite)]methane.
AV A color concentrate consisting of a 25% solution of carbon black in polyethylene.
AVI A color concentrate consisting of a 35% solution of carbon black in polystyrene.
AVII TINUVIN 327: 2(2'-hydroxy-3',5'-di-tert. butyl phenyl)-7-chloro-benzotriazole.
AVIII WILSON 3917: A commercially available grey polyethylene color concentrate.

The various materials listed in the following TABLE I were extruded and strand pelletized in a 1½" single screw extruder. The conditions of extrusion were as indicated in TABLE I. The resultant product was then injection molded into slab having the following dimensions: 3"×4.5"×0.080". The molded slabs were conditioned for seven days at 50% relative humidity at room temperature. The slabs were then tested for various physical properties. During extrusion and processing, observations were noted as to the processability of the mixtures. The observations, tests and test results were as indicated in TABLE II.

Examples 1, 2, 4, 6, 8, 17, 19, 21, 23, 26, 27, 31, 32, 49, 50, 51, 55, 56, 57 and 75 are controls where no processing aid is used.

TABLE I

| EXAMPLE | PU Parts by Weight | PC pbw | ABS pbw | PM pbw | PT pbw | PA pbw | A pbw | Screw Set | % Load | Die Pressure psi | Die Temp. °F. | Front Zone Temp. °F. | Rear Zone Temp. °F. |
|---|---|---|---|---|---|---|---|---|---|---|---|---|---|
| 1 | I-75 | I-25 | | | | | VI-0.575 I-0.50 | 4.0 | 45 | 1500 | 470° F. | 300° F. | 450° F. |
| 2 | I-75 | I-25 | | | | | VI-5.75 I-0.50 | 4.4 | 65 | 1800 | 470 | 300 | 430 |
| 3 | I-75 | I-25 | | | | II-2.0 | VI-5.75 I-0.50 | 4.4 | 60 | 2000 | 470 | 300 | 400 |
| 4 | I-75 | I-25 | | | | | V-0.50 I-0.50 | 4.4 | 60 | 1700 | 470 | 300 | 400 |
| 5 | I-75 | I-25 | | | | II-2.0 | V-5.0 I-0.5 | 4.4 | 65 | 1800 | 470 | 300 | 400 |
| 6 | I-80 | | | II-20 | | | I-0.5 VIII-2.0 | 5.7 | 75 | 2600 | 425 | 310 | 440 |
| 7 | I-80 | | | II-20 | IV-2.0 | | I-0.25 VIII-2.0 | 5.7 | 60 | 3600 | 425 | 300 | 470 |
| 8 | I-75 | I-25 | | | | | I-0.50 VIII-1.0 | 4.0 | 55 | 1800 | 440 | 330 | 420 |
| 9 | I-75 | I-25 | | | IV-1.0 | | I-0.50 VIII-1.0 | 4.0 | 55 | 1100 | 440 | 340 | 440 |
| 10 | I-75 | I-25 | | | IV-2.0 | | I-0.50 VIII-1.0 | 4.0 | 55 | 1700 | 440 | 340 | 440 |
| 11 | I-75 | I-25 | | | IV-4.0 | | I-0.50 VIII-1.0 | 4.0 | 55 | 1600 | 440 | 340 | 440 |
| 12 | I-75 | I-25 | | | | II-1.0 | I-0.50 VIII-1.0 | 4.0 | 50 | 1000 | 440 | 340 | 440 |
| 13 | I-75 | I-25 | | | | II-4.0 | I-0.50 VIII-1.0 | 4.0 | 60 | 1800 | 440 | 340 | 440 |
| 14 | I-75 | I-25 | | | | III-1.0 | I-0.50 VIII-1.0 | 4.0 | 55 | 1700 | 440 | 340 | 440 |
| 15 | I-75 | I-25 | | | | III-2.0 | I-0.50 VIII-1.0 | 4.0 | 55 | 1500 | 440 | 340 | 440 |
| 16 | I-75 | I-25 | | | IV-4.0 | | I-0.50 VIII-1.0 | 4.0 | 50 | 1500 | 440 | 340 | 440 |
| 17 | I-75 | I-25 | | | | | II-0.50 VIII-1.0 | 4.0 | 50 | 1800 | 440 | 340 | 440 |
| 18 | I-75 | I-25 | | | IV-10.0 | | II-0.50 VIII-1.0 | 4.1 | 55 | 1800 | 450 | 340 | 440 |
| 19 | II-90 | | | | I-10 | | I-0.50 VI-0.575 | 4.1 | 75 | 3800 | 470 | 330 | 430 |
| 20 | II-90 | | | | I-10 | II-2.0 | I-0.50 VI-0.575 | 4.5 | 60 | 3100 | 470 | 330 | 430 |
| 21 | II-90 | | | | III-10 | | I-0.50 VI-0.575 | 4.2 | 65 | 1400 | 480 | 320 | 440 |
| 22 | II-90 | | | | III-10 | II-5.0 | I-0.50 VI-0.575 | 4.2 | 60 | 2000 | 450 | 330 | 440 |
| 23 | II-40 | I-60 | | | | | I-0.50 | 5.8 | 85 | 1900 | 500 | 370 | 480 |
| 24 | II-40 | I-60 | IV-5.0 | | | II-1.0 | I-0.50 | 6.4 | 87 | 1900 | 510 | 365 | 490 |
| 25 | II-40 | I-60 | | | | IV-1.0 | I-0.50 | 5.8 | 73 | 1200 | 510 | 350 | 530 |
| 26 | II-40 IV-40 | | | I-20 | | | III-0.50 | 4.0 | 50 | 3500 | 425 | 330 | 480 |
| 27 | II-30 IV-30 | | | I-40 | | | III-0.50 | 4.0 | 60 | 3500 | 425 | 330 | 480 |
| 28 | II-40 IV-40 | | | I-20 | | II-2.0 | III-0.50 | 4.0 | 60 | 3500 | 425 | 330 | 480 |
| 29 | II-40 IV-40 | | | I-20 | | II-2.0 | III-0.50 | 4.0 | 60 | 3500 | 425 | 330 | 480 |
| 30 | II-30 IV-30 | | I-5 | I-40 | | II-2.0 | III-0.50 | 4.0 | 50 | 3000 | 425 | 330 | 480 |
| 31 | II-50 IV-50 | | I-5 | | | | III-0.50 | 4.0 | 55 | 4600 | 425 | 330 | 480 |

TABLE I-continued

| EXAMPLE | PU Parts by Weight | PC pbw | ABS pbw | PM pbw | PT pbw | PA pbw | A pbw | Screw Set | % Load | Die Pressure psi | Die Temp. °F. | Front Zone Temp. °F. | Rear Zone Temp. °F. |
|---|---|---|---|---|---|---|---|---|---|---|---|---|---|
| 32 | III-100 | | | | | | I-0.05 | 4.0 | 56 | 1300 | 435 | 320 | 470 |
| 33 | III-100 | | | | | V-0.50 | I-0.05 | 4.0 | 50 | 2300 | 435 | 320 | 470 |
| 34 | III-100 | | | | | IV-0.50 | I-0.05 | 4.0 | 50 | 1000 | 435 | 320 | 470 |
| 35 | III-100 | | | | | III-0.50 | I-0.05 | 4.7 | 60 | 1500 | 460 | 280 | 510 |
| 36 | IV-90 | | I-10 | | | IV-2.0 | I-0.4 VII-0.5 | 4.0 | 75 | 3000 | 445 | 290 | 440 |
| 37 | IV-80 | | I-20 | | | IV-2.0 | I-0.4 VII-0.5 | 4.0 | 80 | 2800 | 455 | 300 | 440 |
| 38 | IV-70 | | I-30 | | | IV-2.0 | I-0.4 VII-0.5 | 4.0 | 70 | 2400 | 455 | 300 | 440 |
| 39 | III-90 | | I-10 | | | IV-2.0 | I-0.05 | 4.0 | 70 | 2000 | 455 | 300 | 440 |
| 40 | IV-70 | | | I-30 | | V-2.0 | | 4.5 | 50 | 3200 | 365 | 340 | 400 |
| 41 | IV-70 | | | I-30 | | II-2.0 | | 3.5 | 55 | 3000 | 390 | 340 | 370 |
| 42 | IV-50 | | | I-50 | | IV-2.0 | | 3.5 | 50 | 2700 | 390 | 345 | 350 |
| 43 | IV-50 | | | II-50 | | IV-2.0 | | 3.5 | 50 | 2900 | 385 | 340 | 350 |
| 44 | III-85 | | IV-15 | | | II-2.0 | I-0.2 III-0.5 | 4.8 | 55 | 2400 | 416 | 330 | 450 |
| 45 | III-90 | | IV-10 | | | V-2.0 | I-0.1 III-0.2 | 4.5 | 75 | 2900 | 400 | 310 | 370 |
| 46 | III-95 | | IV-5 | | | V-1.0 | I-0.1 III-0.1 | 4.5 | 70 | 1900 | 400 | 330 | 390 |
| 47 | III-97 | | IV-3 | | | V-0.50 | I-0.05 | 4.5 | 75 | 1800 | 410 | 340 | 370 |
| 48 | III-99 | | IV-1 | | | V-0.50 | I-0.05 | 4.5 | 70 | 1800 | 410 | 340 | 370 |
| 49 | IV-90 | | | I-10 | | | | 5.0 | 45 | 2300 | 440 | 330 | 460 |
| 50 | IV-70 | | | I-30 | | | | 6.0 | 50 | 2200 | 450 | 330 | 480 |
| 51 | IV-50 | | | I-50 | | | | 5.5 | 60 | 3800 | 440 | 330 | 480 |
| 52 | IV-90 | | | I-10 | | I-2.0 | | 6.0 | 50 | 4400 | 450 | 330 | 480 |
| 53 | IV-70 | | | I-30 | | I-2.0 | | 5.5 | 75 | 3000 | 460 | 340 | 500 |
| 54 | IV-50 | | | I-50 | | I-2.0 | | 5.5 | 80 | 2800 | 460 | 340 | 510 |
| 55 | IV-90 | | | II-10 | | | | 5.5 | 50 | 4400 | 450 | 310 | 450 |
| 56 | IV-70 | | | II-30 | | | | 5.5 | 60 | 3500 | 440 | 320 | 460 |
| 57 | IV-50 | | | II-50 | | | | 6.2 | 50 | 3400 | 450 | 320 | 480 |
| 58 | IV-90 | | | II-10 | | I-2.0 | | 6.0 | 85 | 3200 | 450 | 320 | 480 |
| 59 | IV-70 | | | II-30 | | I-2.0 | | 6.0 | 65 | 2500 | 450 | 320 | 470 |
| 60 | IV-50 | | | II-50 | | I-2.0 | | 6.0 | 70 | 3500 | 450 | 320 | 480 |
| 61 | IV-80 | | IV-20 | | | IV-2.0 | | 3.5 | 65 | 1600 | 400 | 330 | 400 |
| 62 | IV-70 | | IV-30 | | | IV-2.0 | | 3.5 | 65 | 2300 | 345 | 320 | 395 |
| 63 | IV-90 | | IV-10 | | | V-2.0 | | 3.5 | 55 | 3100 | 300 | 300 | 375 |
| 64 | IV-80 | | IV-20 | | | V-2.0 | | 5.0 | 75 | 4100 | 350 | 340 | 375 |
| 65 | IV-70 | | IV-30 | | | V-2.0 | | 3.5 | 50 | 3000 | 380 | 280 | 360 |
| 66 | IV-90 | | II-10 | | | IV-2.0 | | 3.5 | 73 | 2900 | 400 | 310 | 370 |
| 67 | IV-90 | | III-10 | | | IV-2.0 | | 3.5 | 70 | 2800 | 410 | 320 | 360 |
| 68 | IV-90 | | IV-10 | | | II-2.0 | | 3.5 | 75 | 2500 | 410 | 340 | 370 |
| 69 | IV-80 | | IV-20 | | | II-3.0 | | 3.5 | 65 | 1900 | 420 | 340 | 390 |
| 70 | IV-70 | | II-30 | | | V-2.0 | | 3.5 | 60 | 1600 | 410 | 350 | 390 |
| 71 | IV-70 | | III-30 | | | V-2.0 | | 3.5 | 60 | 1900 | 400 | 350 | 390 |
| 72 | IV-70 | | | I-30 | | IV-2.0 | | 4.5 | 72 | 3300 | 370 | 340 | 400 |
| 73 | IV-70 | | | II-30 | | V-2.0 | | 4.5 | 50 | 2400 | 365 | 340 | 400 |
| 74 | IV-100 | | | | | IV-2.0 | | 3.5 | 55 | 1700 | 420 | 350 | 400 |
| 75 | V-100 | | | | | | I-0.10 VII-0.50 | 3.8 | 60 | 1000 | 460 | 350 | 520 |
| 76 | V-100 | | | | | II-1.0 | I-0.10 IV-0.10 VII-0.50 | 4.8 | 60 | 1000 | 460 | 350 | 520 |
| 77 | V-100 | | IV-5 | | | IV-2.0 | I-0.10 IV-0.20 VII-0.50 | 5.2 | 60 | 1000 | 460 | 350 | 520 |
| 78 | V-100 | | | | | IV-1.0 | I-0.10 IV-0.10 VII-0.50 | 5.0 | 60 | 1000 | 460 | 350 | 520 |

TABLE II

| EXAMPLE | Extrusion, Processing Evaluation | Pellet and/or Strand Appearance | Tensile Strength psi | Elongation % | Elongation Set % | MODUUS (PSI) 100% | 200% | 300% | Shore A/D Hardness | IMI* |
|---|---|---|---|---|---|---|---|---|---|---|
| 1 | Very good | Black, sl. rough | 2770 | 300 | 66 | 2165 | 2645 | 2740 | 94/53 | — |
| 2 | Very good | Black, sl. rough | 2520 | 250 | 55 | 2085 | 2520 | — | 93/52 | — |
| 3 | Very good | Black sl. rough | 3120 | 280 | 80 | 2290 | 2910 | — | 94/55 | — |
| 4 | Very good | Black, looks sl. white | 2830 | 325 | 75 | 1920 | 2505 | 2765 | 91/51 | |

TABLE II-continued

| EXAMPLE | Extrusion, Processing Evaluation | Pellet and/or Strand Appearance | Tensile Strength psi | Elongation % | Elongation Set % | MODULUS (PSI) 100% | 200% | 300% | Shore A/D Hardness | IMI* |
|---|---|---|---|---|---|---|---|---|---|---|
| 5 | Very good | Black, sl. rough | 2980 | 280 | 80 | 2165 | 2775 | — | 90/53 | — |
| 6 | Very good | Black, glossy, sl. rough | 2867 | 475 | 153 | 1563 | 1657 | 1997 | 94/45 | — |
| 7 | Good | Black, glossy, rough | 3633 | 483 | 160 | 1707 | 2027 | 2350 | 95/49 | — |
| 8 | Very good | Grey, glossy, no clear centers | 2294 | 267 | 23 | 1971 | 2263 | — | 92/45 | — |
| 9 | Very good | Grey, glossy, no clear centers | 2724 | 298 | 43 | 2109 | 2680 | — | 92/46 | — |
| 10 | Very good | grey, glossy signs of poor mixing | 2562 | 275 | 33 | 2239 | 2562 | — | 92/46 | — |
| 11 | Very good | grey, glossy signs of poor mixing | 2838 | 298 | 47 | 2273 | 2756 | — | 93/47 | — |
| 12 | Very good | grey, some clear centers | 2459 | 250 | 30 | 2176 | 2459 | — | 93/47 | — |
| 13 | Very good | grey, signs of poor mixing | 2651 | 250 | 33 | 2247 | 2651 | — | 93/47 | — |
| 14 | Very good | grey, glossy no clear centers | 2317 | 250 | 30 | 2070 | 2267 | — | 93/47 | — |
| 15 | Very good | grey, glossy no clear centers | 2500 | 288 | 33 | 2199 | 2500 | — | 93/46 | — |
| 16 | Very good | grey, glossy some signs of poor mixing | 2500 | 299 | 43 | 2105 | 2500 | — | 93/47 | — |
| 17 | Very good | grey, glossy some signs of poor mixing | 2335 | 258 | 33 | 2095 | 2335 | — | 93/47 | — |
| 18 | Fair | grey, spongy center | 2348 | 267 | 35 | 2078 | 2330 | — | 93/47 | — |
| 19 | Very good | Black, smooth | 3265 | 500 | 97 | 1967 | 2237 | 2529 | 95/46 | 46.7 |
| 20 | Poor, hand fed | Black, smooth | 3822 | 450 | 77 | 1953 | 2277 | 2750 | 95/46 | 48.7 |
| 21 | Good | Black, smooth | 3139 | 458 | 107 | 2172 | 2533 | 2803 | 95/48 | 43.1 |
| 22 | Good, hand fed | Black, smooth, dull | 2794 | 392 | 90 | 2334 | 2610 | 2767 | 95/41 | 31.1 |
| 23 | Fair-good very little hand feed | Smooth, glossy | 4945 | 120 | 80 | 4780 | — | — | 97/71 | 36.5 |
| 24 | Fair, hand fed | Smooth, glossy | 5130 | 175 | 100 | 4605 | — | — | 97/71 | 56.7 |
| 25 | Good, no hand feed | Smooth glossy | 5835 | 175 | 110 | 5050 | — | — | 97/72 | 71.2 |
| 26 | Good | Good, white, opaque | 3663 | 550 | 170 | 1594 | 1894 | 2243 | 91/46 | 18.9 |
| 27 | Good | Good, white, opaque | 3341 | 533 | 273 | 2596 | 2707 | 2798 | 95/57 | 39 |
| 28 | Good | Good, white, opaque | 4233 | 525 | 167 | 1701 | 2069 | 2489 | 91/47 | 20.7 |
| 29 | Good | Good, white, opaque | 4255 | 533 | 173 | 1633 | 1939 | 2335 | 91/46 | 29.3 |
| 30 | Good | Good, white, opaque | 3745 | 475 | 263 | 2591 | 2696 | 2847 | 95/55 | 22.9 |
| 31 | Good | Good, white, opaque | 4492 | 600 | 68 | 1029 | 1311 | 1774 | 84/36 | 10.6 |
| 32 | Fair, hand fed | Yellow, clear, smooth | 7354 | 592 | 22 | 720 | 845 | 1152 | 83/35 | 19.8 |
| 33 | Very good | Yellow, clear, smooth | 7863 | 592 | 15 | 715 | 833 | 1147 | 79/35 | 15.1 |
| 34 | Poor, hand fed | Clear pink, smooth | 7069 | 600 | 20 | 696 | 827 | 1128 | 82/32 | 31.1 |
| 35 | Fair, hand fed | Hazy yellow, smooth | 7567 | 617 | 15 | 705 | 818 | 1147 | 82/34 | 31.1 |
| 36 | Good | Clear, sl. | 7552 | 530 | 40 | 778 | 972 | 1361 | 86/38 | 9.5 |

TABLE II-continued

| EXAMPLE | Extrusion, Processing Evaluation | Pellet and/or Strand Appearance | Tensile Strength psi | Elongation % | Elongation Set % | MODUUS (PSI) 100% | 200% | 300% | Shore A/D Hardness | IMI* |
|---|---|---|---|---|---|---|---|---|---|---|
| 37 | Good | Clear sl. white haze | 7200 | 500 | 45 | 800 | 1000 | 1500 | 85/37 | 7.6 |
| 38 | Good | Clear, sl. white haze | 6244 | 490 | 55 | 810 | 1012 | 1518 | 95/39 | 7.7 |
| 39 | Good | Clear, sl. yellow haze | 6816 | 533 | 30 | 672 | 864 | 1248 | 83/35 | 11.9 |
| 40 | Good | Thin white | 5360 | 520 | 165 | 1847 | 2175 | 2565 | 95/47 | — |
| 41 | Fair | White | 6395 | 590 | 210 | 1895 | 2185 | 2395 | 93/50 | — |
| 42 | Fair | White, rough | 6250 | 500 | 340 | 3180 | 3097 | 3175 | 96/61 | — |
| 43 | Poor | Cloudy, rough, grainy | 4075 | 460 | 285 | 2970 | 2910 | 2990 | 97/63 | — |
| 44 | Good | Clear, smooth, yellow | 7065 | 565 | 53 | 743 | 900 | 1207 | 88/38 | — |
| 45 | Good | Clear, smooth, sl. yellow | 7831 | 567 | 50 | 803 | 1004 | 1436 | 85/38 | 10.9 |
| 46 | Good | Clear, smooth, hazy | 7669 | 570 | 25 | 797 | 929 | 1295 | 83/36 | 13.9 |
| 47 | Very good | Clear, smooth, hazy | 7252 | 570 | 40 | 752 | 878 | 1269 | 82/36 | 12.3 |
| 48 | Good | Clear, smooth, hazy | 7779 | 567 | 20 | 675 | 868 | 1189 | 82/35 | 13.0 |
| 49 | Good | White, smooth | 4280 | 658 | 100 | 784 | 988 | 1315 | 82/34 | 52.4 |
| 50 | Good | White, smooth | 1757 | 600 | 116 | 1012 | 974 | 1003 | 86/33 | 55.6 |
| 51 | " | White, sl. rough | 2700 | 133 | 50 | 2579 | — | — | 96/54 | 48.0 |
| 52 | " | White, smooth | 6161 | 650 | 100 | 908 | 1144 | 1506 | 85/37 | 39.3 |
| 53 | " | White, rough | 2501 | 603 | 206 | 1571 | 1750 | 1815 | 88/41 | 46.4 |
| 54 | " | White, sl. rough | 2656 | 142 | 33 | 2613 | — | — | 93/54 | 50.9 |
| 55 | " | White, smooth | 4340 | 667 | 87 | 830 | 979 | 1230 | 85/37 | 50.0 |
| 56 | " | White, rough | 4428 | 658 | 263 | 1906 | 1913 | 2017 | 96/52 | 76.0 |
| 57 | Fair | White, rough | 3333 | 87 | 27 | — | — | — | 98/61 | 117.4 |
| 58 | Good | White, rough | 3969 | 683 | 133 | 890 | 1060 | 1366 | 85/36 | 41.9 |
| 59 | Good | White, smooth | 2181 | 500 | 137 | 1365 | 1607 | 1842 | 92/42 | 81.4 |
| 60 | Fair | White, smooth | 3429 | 125 | 40 | 3240 | — | — | 97/60 | 82.9 |
| 61 | Good | Clear, sl. yellow | 3450 | 620 | 100 | 795 | 960 | 1160 | 89/43 | 4.6 |
| 62 | Good | Clear, sl. yellow | 3420 | 615 | 100 | 870 | 1025 | 1210 | 89/40 | 15.4 |
| 63 | Good | Clear, sl. yellow | 5615 | 610 | 70 | 755 | 910 | 1160 | 87/42 | 9.3 |
| 64 | Poor | Clear, sl. yellow | 5030 | 645 | 90 | 785 | 950 | 1175 | 89/42 | 12 |
| 65 | Good | Clear, sl. yellow | 2580 | 590 | 120 | 795 | 1020 | 1200 | 90/44 | 9.8 |
| 66 | Good | Cloudy, sl. yellow | 6230 | 615 | 85 | 864 | 1160 | 1550 | 89/42 | 8.8 |
| 67 | Good | Cloudy, sl. yellow | 5680 | 615 | 80 | 905 | 1160 | 1550 | 88/41 | 10.1 |
| 68 | Good | Clear, sl. yellow | 6185 | 590 | 60 | 795 | 990 | 1290 | 88/42 | 7.9 |
| 69 | Good | Clear, sl. yellow | 4500 | 610 | 100 | 870 | 1000 | 1300 | 91/41 | 11.2 |
| 70 | Good | Opaque, yellow | 1530 | 400 | 140 | 1205 | 1335 | 1436 | 93/48 | 20.6 |
| 71 | Good | Opaque, yellow | 1226 | 365 | 60 | 1125 | — | — | 92/44 | 28.8 |
| 72 | Fair | Opaque, white | 7926 | 540 | 220 | 1865 | 2060 | 2315 | 94/49 | 16.6 |
| 73 | Fair | Opaque, white | 6730 | 540 | 245 | 2115 | 2245 | 2475 | 95/54 | 35.2 |

TABLE II-continued

| EXAMPLE | Extrusion, Processing Evaluation | Pellet and/or Strand Appearance | Tensile Strength psi | Elongation % | Elongation Set % | MODUUS (PSI) 100% | MODUUS (PSI) 200% | MODUUS (PSI) 300% | Shore A/D Hardness | IMI* |
|---|---|---|---|---|---|---|---|---|---|---|
| 74 | Good | Cloudy, yellow | 7775 | 590 | 35 | 745 | 905 | 1200 | 85/39 | 12.1 |
| 75 | Extremely Poor | — | 6329 | 583 | 40 | 1121 | 1438 | 1953 | 89/44 | — |
| 76 | Poor | — | 8671 | 558 | 27 | 1203 | 1531 | 2163 | 88/45 | — |
| 77 | Poor better than 76 | — | Would not run -- Bad Material | | | | | | | |
| 78 | Poor, better than 76 | — | 6690 | 550 | 37 | 1172 | 1511 | 2094 | 88/45 | — |

*IMI = intrinsic melt index, gms material extruded per 10 minutes. This test was conducted using a Monsanto capillary Rheometer having an orifice 4D of 15.

What is claimed is:

1. A thermoplastic composition comprising
   (A) from 40 to 99% by weight of a thermoplastic polyurethane,
   (B) from 1 to 60% by weight of a thermoplastic polymer selected from the group consisting of thermoplastic polycarbonates, thermoplastic polyoxymethylenes, thermoplastic acrylonitrile/butadiene/styrene graft copolymers, thermoplastic polybutylene terephthalates, thermoplastic polyethylene terephthalates, and mixtures thereof, and
   (C) from 0.5 to 10% by weight, based on the total amount of (A) and (B) of a processing aid which is an acrylic polymer having a number average molecular weight of from 500,000 to 1,500,000.

2. The composition of claim 1 wherein said acrylic polymer is selected from the group consisting of (a) homopolymers of methyl methacrylate, (b) copolymers of methylmethacrylate and either n-butyl methacrylate or ethyl acrylate, and (c) terpolymers of methyl methacrylate, n-butyl acrylate and styrene.

3. The composition of claim 2 wherein component (C) comprises from 1 to 5 percent by weight.

4. The composition of claim 2, wherein component (B) comprises a thermoplastic polycarbonate.

* * * * *